(12) United States Patent
McMillan

(10) Patent No.: US 6,835,021 B1
(45) Date of Patent: Dec. 28, 2004

(54) TRAILER ACCESSORY STABILIZING DEVICE

(76) Inventor: Keith McMillan, 1649 Riverhaven Dr. South, Salem, OR (US) 97302

( * ) Notice: Subject to any disclaimer, the term of this patent is extended or adjusted under 35 U.S.C. 154(b) by 83 days.

(21) Appl. No.: 10/446,982

(22) Filed: May 28, 2003

(51) Int. Cl.$^7$ .............................. F16B 2/14; B60D 1/52
(52) U.S. Cl. ............................ 403/374.4; 403/374.3; 403/297; 280/504; 280/506
(58) Field of Search ............................... 403/297, 370, 403/373, 374.1, 374.2, 374.3, 374.4; 280/504, 506

(56) References Cited

U.S. PATENT DOCUMENTS

| | | | | |
|---|---|---|---|---|
| 2,280,662 A | * | 4/1942 | Pawsat | ........................ 403/370 |
| 3,194,467 A | * | 7/1965 | Goonan et al. | |
| 5,197,349 A | * | 3/1993 | Herman | .................. 403/297 X |
| 5,244,133 A | | 9/1993 | Abbott et al. | |
| 5,251,494 A | * | 10/1993 | Edwards | |
| 5,333,888 A | * | 8/1994 | Ball | ........................ 280/504 X |
| 5,344,175 A | | 9/1994 | Speer | |
| 5,423,566 A | * | 6/1995 | Warrington et al. | .... 280/504 X |
| 5,685,686 A | * | 11/1997 | Burns | .................. 403/374.5 X |

* cited by examiner

Primary Examiner—John R. Cottingham
Assistant Examiner—Ryan M. Flandro
(74) Attorney, Agent, or Firm—Robert K. Lau

(57) ABSTRACT

A trailer accessory stabilizing device for inserting into a motor vehicle trailer hitch receiver, said device comprising a shank member and a wedge member adapted for insertion into said hitch receiver, each member having abutting edges that align along a compound miter, and a rod for moving the members along the two planes of the compound miter thereby causing forces to be exerted in four opposite and opposing directions against the inner walls of the trailer hitch receiver which in turn results in an substantially immovable friction-fit between the device and the trailer hitch receiver. Whereupon, a variety of accessories may be fitted or mounted on to shank portion extending outward from the trailer hitch receiver.

5 Claims, 2 Drawing Sheets

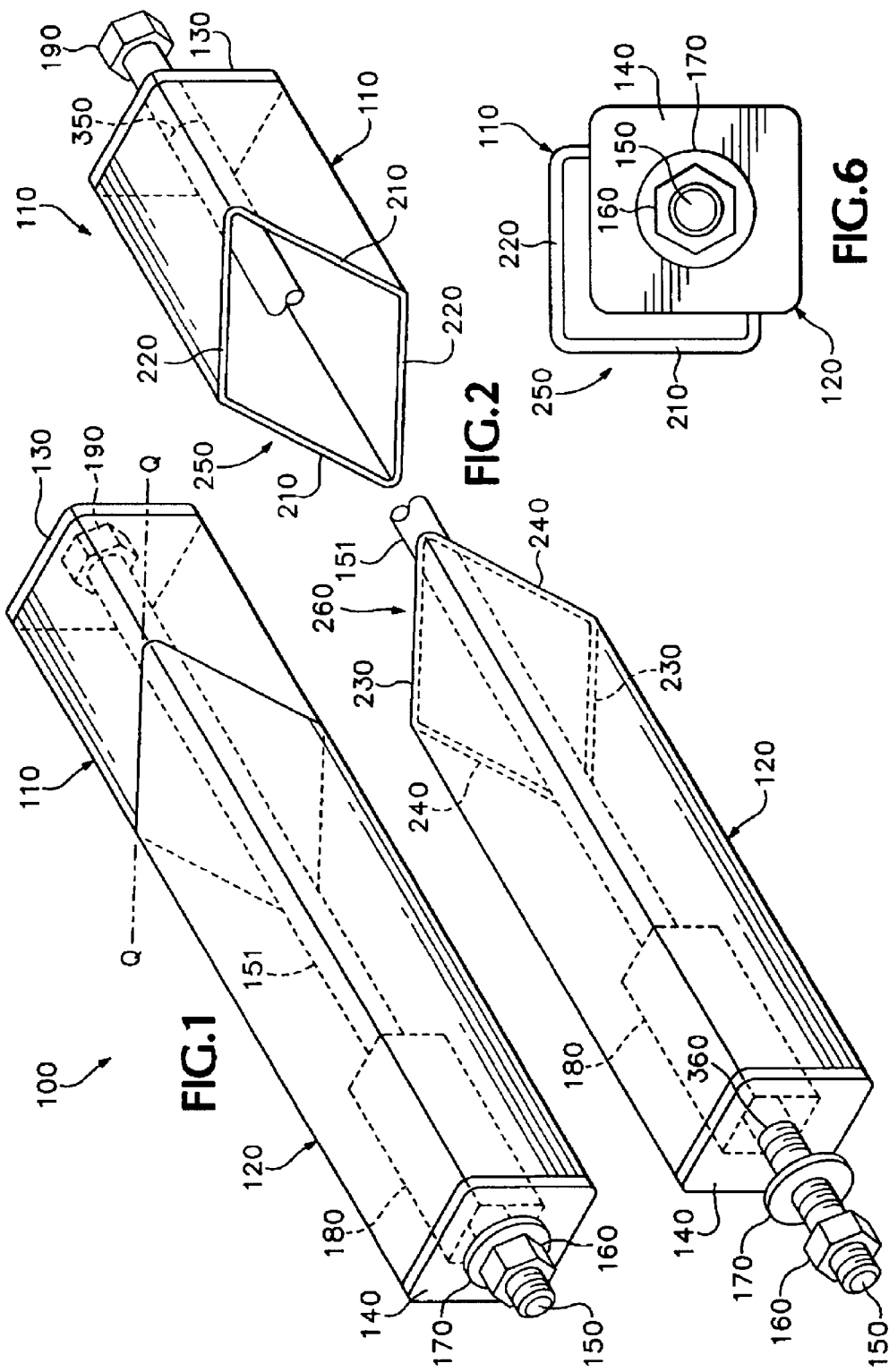

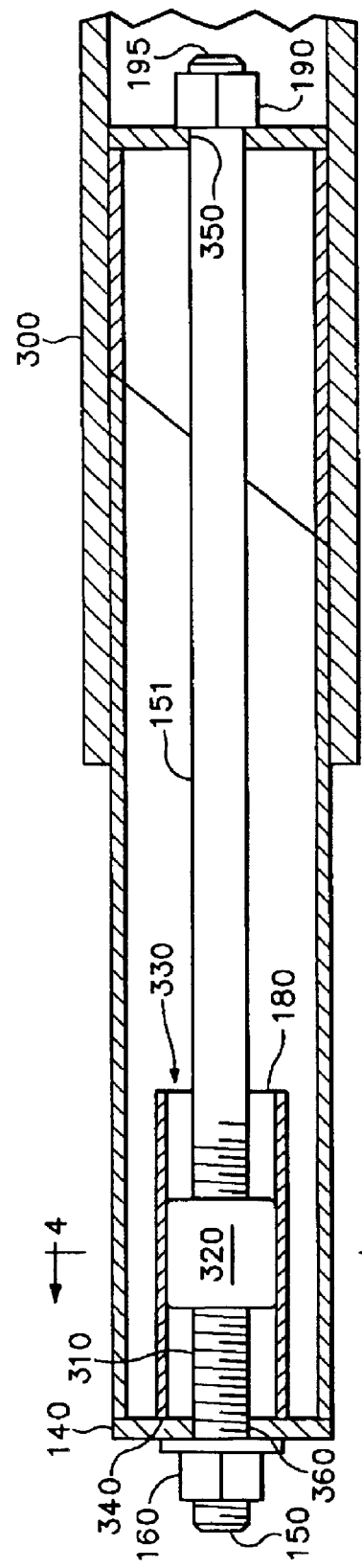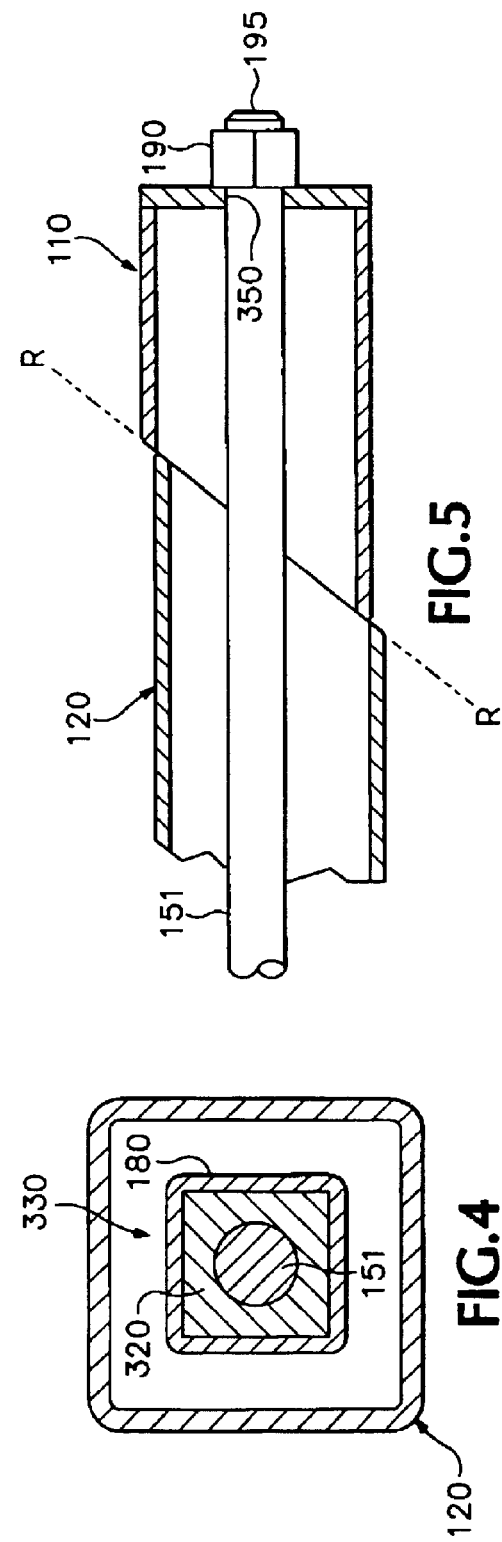

TRAILER ACCESSORY STABILIZING DEVICE

CROSS-REFERENCE TO RELATED APPLICATIONS

Not applicable.

STATEMENT REGARDING FEDERALLY SPONSORED RESEARCH

Not applicable.

SEQUENCE LISTING

Not applicable.

BACKGROUND OF THE INVENTION

1. Field of the Invention

The present invention relates to a new device to securely mount accessories, attachments and other equipment to existing trailer hitch receiver hardware currently found on pickup trucks, vans, sport utility vehicles (SUV's), recreational vehicles, and automobiles. For example, U.S. Pat. Nos. 6,511,088; 6,336,413; 6,082,269; and 6,189,458, show tables, umbrellas, and chairs being used with trailer hitch receivers.

2. Description of Prior Art

Many vehicles today are equipped with receiver-type trailer hitches. These types of trailer hitches typically are a square tube, normally 1½ or 2 inches internal height and width, attached to the undercarriage of a vehicle. A second tube acts as a support member, for the aforementioned accessories, and includes outer dimensions slightly smaller than the internal dimensions of the receiver tube and is slidable within the receiver tube. The support member is horizontal and is used to support a number of accessories. In prior art devices, the support member is secured to the hitch receiver tube by a pin that is inserted through the two tubes and locked or clipped to prevent relative movement between the two tubes. This provides a universal system that allows a vehicle user to be able to use various trailers, carriers, and other accessories with a single coupling system.

To use such accessories as exemplified in the foregoing patents, it is important that the connection between the accessory and the trailer hitch receiver is tight and substantially immovable. Accordingly, a particular problem with the prior art receiver-coupling systems is the clearance between the internal dimensions of the hitch receiver and the external dimensions of the support member to be inserted. The clearance between the internal walls of the hitch receiver tubes and the support member by necessity must have sufficient clearance so that the support member may be inserted into the hitch receiver. However, this clearance causes relative movement between the two tubes. The support member tends to move about within the hitch receiver thereby providing unstable support for the various attached accessories. In addition, the loose fit of the support member to the trailer hitch receiver tends to cause a rattling sound for those accessories that are intended to be used during the driving of a motor vehicle.

There have been a number of attempts to solve this and other problems. These attempts all required the use of specially designed receivers, support members, or accessories in order to reduce the clearance between the receiver and support member. Examples of these prior attempts are disclosed in U.S. Pat. Nos. 5,423,566; 5,593,172; 5,735,539; 5,879,102; 5,988,667; 6,010,049; 6,010,143; 6,010,144; and 6,105,989. These prior devices either require specially designed receivers and support members or use extraneous mounting devices to minimize the loose connection between the receiver and the support member.

Of particular interest is U.S. Pat. No. 5,244,133 to Abbott. Abbott discloses a trailer hitch securing device having a support member comprising a first member and a second member, with the second member being a wedge. The first and second members of the device are mated along a single incline plane (a single miter). The Abbott device seeks to provide a secure connection for accessories attached to the trailer hitch by applying opposing forces along a single plane, i.e., along the vertical axis. However, because force is only applied in two opposing directions, and therefore only against two opposing interior walls of a trailer hitch receiver, the Abbott device is susceptible to side to side, i.e., horizontal or laterally, movement. Consequently, the Abbott device will eventually loosen and compromises the stability and security of the accessory that is attached to the trailer hitch receiver. Moreover, because the Abbott device comprises a number of complex linkages and moving components and requires custom manufactured components, it is costly to manufacture.

Therefore, there is a need for a device that provides opposite and opposing forces against all four inner walls of a trailer hitch receiver, so as to provide reliable support for trailer hitch accessories, which is economical to manufacture and can be made from readily available components.

BRIEF SUMMARY OF THE INVENTION

The present invention solves the aforementioned and other problems by providing a device for securely clamping a support member to a trailer hitch receiver. This securing device exert forces in four opposite and opposing directions within the internal walls of a trailer hitch receiver.

Other features and advantages of the present invention will become apparent from the following detailed description taken into conjunction with the accompanying drawings which illustrate by way of example the principles of the invention.

BRIEF DESCRIPTION OF THE SEVERAL VIEWS OF THE DRAWINGS

FIG. 1 is a perspective view of a preferred embodiment of the invention.

FIG. 2 is an exploded perspective view of a preferred embodiment the invention.

FIG. 3 is a cross-sectional view, along the longitudinal plane, of a preferred embodiment of the invention in a trailer hitch receiver.

FIG. 4 is a cross-sectional view of a preferred embodiment of the invention along line 4—4.

FIG. 5 is a cross-sectional view showing a preferred embodiment of the invention in an activated state.

FIG. 6 is an end view of the preferred embodiment shown in FIG. 5.

DETAILED DESCRIPTION OF THE INVENTION

The present invention, in a preferred embodiment, may be used on original equipment trailer hitch receivers or "after market" trailer hitch receivers. The examples provided for in the foregoing description and shown in the drawings can be all manufactured from readily available materials.

FIG. 1 shows an embodiment of the device 100, comprising two members, a wedge member 110 and a shank member 120, which are connected by rod 151 of substantially uniform diameter. Each of the two members 110 and 120 is a length of square cross-sectional tubing. Wedge member 10 and shank member 120 have complimentary abutting ends 250 and 260, respectively, which are cut along a compound miter, i.e., a cut that is angled in two planes simultaneously, Q and R. See FIGS. 1 and 5. Abutting ends 250 and 260 can be formed simply by taking a single length of a tube of rectangular cross-sectional area and making a single compound miter cut, which results in two pieces have matching edges: in the figures, edges 230 are parallel to edges 220 and likewise edges 210 are parallel to edges 240.

Applicant, for example, places a length of steel tubing of annular square cross-sectional area on one of its longitudinal edges and makes a single inclined cut of about 40 to 60 degrees relative to the vertical plane, which results in abutting ends 250 and 260. Abutting ends 250 and 260 matched along planes Q and R, i.e., a compound miter. See FIGS. 1, 2, and 5.

Rod 151 comprises two distal ends 150 and 195. See, e.g., FIG. 3. Distal ends 150 and 195 have threads which accommodate nuts 160 and 190 respectively. Applicant, for example, uses commercially available threaded steel rods, which are known as "all thread rods" and cuts them to a desired length. The rod traverses the length of device 100 from the outside of shank member end plate 140 through wedge member end plate 130 with distal end 195 extending through hole 350 in wedge member end plate 130. Nut 190 retains and secures wedge member 110 on rod distal end 195. Distal end 150 extends through hole 360 of shank member end plate 140. Nut 160 is threaded on distal end 150, and is used as a tightening means. Both wedge member end plate 130 and shank member end plate 140 are fixedly attached to their respective members. Instead of nut 160, other tightening means can be used such as a crank handle having a threaded hole adapted to thread onto rod distal end 150. In addition, instead of securing rod distal end 195 to wedge member 110 with nut 190, wedge member 110 can be fixedly joined to rod 151 in a number of ways including welding.

To ensure a firm and immoveable engagement between the device and the trailer hitch receiver, rod 151 should be prevented from rotating about its longitudinal axis. If rod 151 is allowed to rotate about its axis, the wedge and shank members will not displace relative to each other, and therefore, a tight and secure engagement will not result. Accordingly, FIG. 3 shows rod rotation eliminating device 330 comprising a tube of rectangular cross-section 180 and nut 320. Tube 180 is of smaller dimensions than shank member 120 and fits inside the annular space of shank member 120. Tube's 180 first end 340 is concentrically aligned with hole 360 and welded to the inner wall of shank member end plate 140. The outer dimensions of nut 320 is sized large enough to fit snugly within the annular space of tube 180 to prevent nut 320 from rotating, but yet small enough to allow nut 320 to slide along the length of the annual space of tube 180. Accordingly, nut 320 may either be a square or hexagonal nut. The dimensions of the hole of nut 320 is sized so that rod 151 can pass through the hole of nut 320. For example, the hole of nut 320 can be sized so that rod 151 can be threaded through the hole of nut 320. Accordingly, rod 151 is passed through the hole of nut 320 until nut 320 is situated about quarter of an inch to about one inch from a distal end 150; nut 320 is then fixedly secured to rod 151 at that location by welding the nut to rod 151 or using another method. The rod and nut arrangement is then slid through tube 180 with distal end 150 extending through hole 360 of shank member end plate 140. Although the length of tube 180 and the location of nut 320 on rod 150 is somewhat discretionary, it is critical that nut 320 be located within the annular space of tube 180 and prevented from rotating about said rod, either by welding or other method of fixedly attaching nut 320 to rod 151, which in turn, will prevent rod 151 from rotating about its longitudinal axis.

Rod rotation eliminating device 330 prevents rod 151 from rotating around its longitudinal axis, which thereby enables rod 151 to urge wedge member abutting end 250 and shank member abutting end 260 to slide against each other, which in turn, will cause the members to exert opposing forces against the four inner walls of the trailer hitch receiver. An alternative to providing rod rotation eliminating device 330 is to fixedly attach rod distal end 195 to wedge member 110 or to its end plate 130. Possible alternatives include, but are not limited to, welding distal end 195 to end plate 130, or tightly sandwiching end plate 130 between another threaded nut (not shown) and nut 190, thereby fixedly attaching rod 150 to wedge member 110.

FIG. 3 also shows device 100 being inserted into the open end of a typical trailer hitch receiver tube 300. Hitch receiver 300 is fixed to the frame of a motor vehicle (not shown in the drawing). Wedge member 110 is undersized to the interior dimensions of trailer hitch receiver 300 so as to be easily inserted into trailer hitch 300. At least a portion of shank member 120, which is proximate to wedge member 110, is sized to fit within the trailer hitch receiver. FIG. 3.

To use device 100, nut 160 is loosened sufficiently to bring wedge member 110 into axial alignment with shank member 120. The aligned elements are then inserted into the open end of the trailer hitch receiver 300, wedge member first. See FIG. 3. Tighten nut 160, which will cause rod 151 to move in an outward direction from shank member end plate 140, thereby causing abutting ends 250 and 260 to be displaced relative to each other along planes Q and R simultaneously. See FIGS. 5 and 6. Accordingly, members 110 and 120 will displaced from each other in six directions, relative to each other and to the interior of the trailer hitch receiver tube, that is: forward, backward, up, down left and right. This causes two adjacent sides of each member, wedge and shank, to push against two opposite adjacent inner walls of trailer hitch receiver 300, thereby causing opposing forces against all four interior walls of the trailer hitch receiver. See FIG. 6. The result is a secure friction fit between the device and the internal walls of the trailer hitch receiver. Accordingly, device 100 will be substantially immovable within trailer hitch receiver 300 and will not wobble laterally, vertically or diagonally. A user can thus support and mount a large variety of accessories, such as, tables, umbrellas, bicycle carriers and so on, without the worry and inconvenience of wobbling and rattling.

To encourage the unhindered slidable movement of wedge and shank members, edges 210, 220, 230, and 240 can be coated with a friction reducing material, such as grease, Polytetrafluoroethylene (Teflon®), plastic taping such as UHMW Polyethylene tape (ultra-high molecular weight) or a commercially available low coefficient of friction film such as those available from the 3M Company.

A preferred embodiment of the invention has been described and illustrated for purposes of clarity and example, it must be understood that many changes, substitutions and modifications will become apparent to those possessed of ordinary skill in the art without thereby departing from the scope and spirit of the present invention which is defined by the following claims.

What is claimed is:

1. A device for securing accessories to a rectangular trailer hitch receiver, which has four inner walls, comprising:
    a first member of rectangular cross-section, said first member comprising a closed end and an open end, said closed end having a hole, said open end being formed into a compound miter and being sized to be slidably interested into said trailer hitch receiver;
    a second member of rectangular cross-section having a size suitable for being slidably inserted into said trailer hitch receiver, said second member further comprising a closed end and an open end, said open end abutting said open end of said first member, said open end of said second member having a compound miter which mates with said compound miter of said first member;
    a tube of rectangular cross section having a first end and a second end, said tube being fixedly attached within the annular space of said first member proximate to said closed end of said first member;
    a nut, said nut having an exterior dimension so as to fit slidably within said tube,
    an elongated rod extending axially through said first member, said tube, said nut's hole, and said second member, said rod having a first end and a second end, said nut being arranged and fixedly attached onto said rod between said rod's first and second end, said first end of said rod extending through said hole of said closed end of said first member, said second member's closed end being restrained to said rod's second end; and
    tightening means operative for urging said rod to displace in an outward direction from said closed and second end of said first member thereby causing said open ends of said first and second members to slide against each other along their complimentary compound miters within said trailer hitch receiver causing said members to push against the four inner walls of said trailer hitch receiver, thereby resulting in a substantially immovable friction fit between said device and said trailer hitch receiver.

2. The device of claim 1, wherein said tightening means comprises a second nut and wherein said rod's first end is threaded, said second nut being screwed onto said threads of said rod, whereby, when said second nut is tightened, said rod urges said members to slide against each other along the two inclined planes of said compound miters simultaneously.

3. The device of claim 1, wherein said tightening means comprises a crank handle, and wherein said rod's first end is threaded, said crank handle being adapted to thread on to said reads of said rod, whereby, when said crank handle is turned, said rod urges said members to slide against each other along the two inclined planes of said compound miters simultaneously.

4. The device of claim 1, wherein said first ends of said shank member and said wedge member are coated with a friction reducing material.

5. The device of claim 4, wherein said friction reducing material is selected from the group consisting of grease, polytetrafluoroethylene, ultra-high molecular weight polyethylene, and low coefficient of friction film.

* * * * *